United States Patent [19]
Gankin et al.

[11] 3,884,948
[45] May 20, 1975

[54] METHOD OF PRODUCING INDIVIDUAL HIGHER BRANCHED CARBOXYLIC ACIDS

[76] Inventors: Viktor Judkovich Gankin; Vyacheslav Alexeevich Rybakov, both of ulitsa Khalturina, 23, kv. 6, Leningrad, U.S.S.R.; David Moiseevich Rudkovsky, deceased, late of Leningrad, U.S.S.R.; Galina Davydovna Rudkovskaya, administrator, Lesnoi prospekt, 61, kv. 250, Leningrad, U.S.S.R.

[22] Filed: Oct. 7, 1971

[21] Appl. No.: 187,546

[52] U.S. Cl. ............ 260/413; 106/243; 260/530 N; 260/601 R
[51] Int. Cl............................................ C08h 17/36
[58] Field of Search........................ 260/413, 530 N

[56] References Cited
UNITED STATES PATENTS
2,639,295  5/1953  Hagemeyer..................... 260/530 N
2,852,563  9/1968  Hagemeyer, Jr. et al....... 260/602 X FOREIGN PATENTS OR APPLICATIONS
1,503,918  10/1969  France............................. 260/530 N
605,005  9/1960  Canada............................. 260/413

OTHER PUBLICATIONS
Noller, Chemistry of Organic Compounds, pp. 230, 231 and 583.

*Primary Examiner*—Lewis Gotts
*Assistant Examiner*—Ethel G. Love
*Attorney, Agent, or Firm*—Holman & Stern

[57] ABSTRACT

A method of producing higher individual branched carboxylic acids by aldol condensation of $\beta$-methyl-branched aldehydes at a temperature ranging from 50° to 100°C, in the presence of an aqueous alkali solution as a catalyst, followed by oxidation of higher $\alpha$, $\beta$-unsaturated aldehydes, that have formed during the aldol condensation, with an oxygen-containing gas in the presence of an aqueous alkali solution at a temperature ranging from 10° to 5°C.

9 Claims, No Drawings

METHOD OF PRODUCING INDIVIDUAL HIGHER BRANCKED CARBOXYLIC ACIDS

The present invention relates to petrochemical processing and more particularly to methods of producing higher branched carboxylic acids.

Higher branched carboxylic acids are known to be finding an ever wider application as substituents for vegetable oils in the synthesis of alkyd resinson whose basis oil-free coating materials are prepared. For this purpose fractions of branched acids $C_9$–$C_{19}$ are usually employed.

These acids are used mostly in the form of glycerine esters which are synthesized according to the following scheme

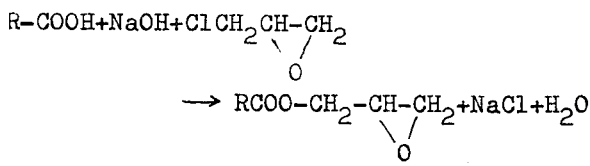

The resulting esters in a mixture with melamine-formaldehyde or polyacrylic resins are used for preparing baking enamels which are employed for coating passenger car bodies.

One of the basic requirements to be met by the esters synthesized with the use of higher branched carboxylic acids is that such esters should be resistant to hydrolysis.

It is known that the rate of hydrolysis of esters and the rate of esterification of acids are determined by the rule of Newman, which states that this rate depends on the number of atoms found in the "six" position with respect to the carbonyl oxygen

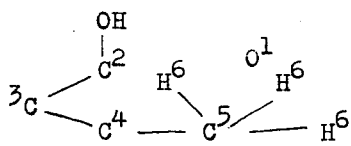

Thus, with a change in the number of the "sixth" atoms in the sequence $0 \rightarrow 3 \rightarrow 6 \rightarrow 9$, the rate of hydrolysis of the esters at 40°C changes as follows: $132 \rightarrow 65.2 \rightarrow 15.4 \rightarrow 0.0170$ litre·mole/sec.

From the above results it follows that the greater the number of the "sixth" atoms in the acid, the more resistant to hydrolysis is the ester thereof.

The methods of producing higher branched carboxylic acids so far reported in literature are not free from essential disadvantages.

In the process of producing branched acids by the method of Koch from olefines, carbon oxide and water concentrated phosphoric and sulphuric acids are used as a catalyst. And though in the case of using sulphuric acid the yield of the desired acids is sufficiently high (85–90 percent), the processes of separating the acid catalyst from the reaction products and regeneration of the very catalyst are associated with considerable difficulties.

Moreover, the molar ratio of the acid catalyst to the olefine is 5–10:1.

It should also be pointed out that the said method allows the producing of only a mixture of acids.

Also known is a method of producing branched carboxylic acids by telomerization of ethylene with lower acids of a normal structure; however, in this case the result is also a mixture of $\alpha$-branched acids $C_5$–$C_{20}$.

This method is also disadvantageous in a low yield of the desired acids (not higher than 30 percent per run) and in the use of scarce tert.-butyl peroxide as the catalyst.

Also known is a method (cf. U.S. Pat. No. 2,153,406) of producing methacrylic acid which, however, does not contain the "sixth" atoms in its structure and, hence, proves to be of no practical interest for the ultimate purposes. Moreover, it is produced in a rather complicated way: methacrolein is oxidized into the corresponding acid under a pressure of up to 20 atm in the medium of anhydrous inert solvents such as benzene, carbon tetrachloride, ethanol and the like, use being also made of salts of variable valency metals as catalysts and of polymerization inhibitors.

A method is described of producing heptane-3,4-dione and ethylpropylacrylic acid. Said method, however, suffers from an essential disadvantage, since the yield of the desired acid is not higher than 85 percent and only oxygen can be used as the oxidant.

Thus, no method is known in the present state of the art for producing individual higher branched carboxylic acids which would be sufficiently simple from the technological standpoint and could ensure a high yield of the desired acids with ag great number of the "sixth" atoms.

It is an object of the present invention to provide a method of producing higher branched carboxylic acids comprising at least nine "sixth" atoms in their structure. As has been pointed out hereinabove, esters prepared on the basis of such acids feature a high resistance to hydrolysis.

Another object of the invention is to provide a method of producing individual branched carboxylic acids.

Still another object of the invention is to provide a method of producing said acids from such easily available and inexpensive stock materials as oxonation aldehydes.

In accordance with the said and other objects, we propose a method of producing higher branched carboxylic acids from $\beta$-methyl-branched aldehydes.

The method proposed by us comprises the following steps. 1. Aldol condensation of $\beta$-methyl-branched aldehydes which is carried out in a reactor under vigorous stirring during 45–120 min., preferably during 50–60 min., in the presence of aqueous solutions of sodium or potassium alkalies as a catalyst. The temperature of the process of condensation of the aldehydes is within 50°–100°C. The concentration of the aqueous solutions of alkalies employed in the aldol condensation is within 1–10 weight percent.

The aldol condensation reaction should preferably be carried out at a temperature ranging from 60° to 80°C in the presence of NaOH solution with a concentration of 4–7 weight percent.

The degree of conversion of aldehydes due to the condensation is 90–95 percent. The aldol condensation reaction features a high yield reaching 85–95 percent. The higher $\alpha$, $\beta$-unsaturated aldehyde separated from the condensation products is purified from the admixtures of the unreacted products and then it is subjected to oxidation to the respective acid.

The chemical mechanism of the condensation stage can be schematically represented as

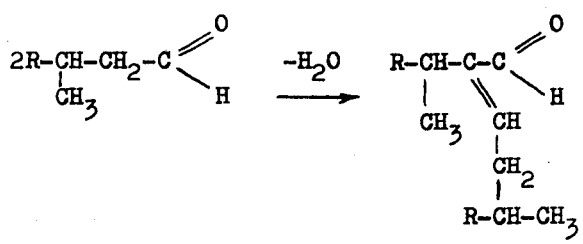

where R is [—CH$_3$]; [—C$_3$H$_7$]; [—C$_5$H$_{11}$].

2. Oxidation of the higher unsaturated aldehydes to the respective branched carboxylic acids is carried out in a reactor under vigorous stirring (Re = 20,000 – 80,000) in the presence of aqueous solutions of NaOH or KOH as catalysts with a concentration of 1–10 weight percent. The reaction mixture is heated under stirring to a temperature of from 10° to 70°C and oxidized with an oxygen-containing gas during 30–80 min. The oxidation of the higher, -unsaturated aldehydes should be preferably effected with air at a temperature of 35°–50°C during 40–60 min.

After neutralizing the reaction mass with 15–25 percent sulphuric acid to pH = 4–7, the mixture is separated by settling. The upper organic layer is the target acid.

The acids produced by the present method were identified by chemical and physico-chemical techniques, namely, by ozonization and chromatographic mass spectrometry.

The conversion degree of the higher unsaturated aldehydes at the oxidation stages reaches 90–95 percent.

The yield of the desired products, that is, of higher unsaturated carboxylic acids at this stage of the process is 90–95 percent; thus the total yield for the initial aldehyde is 80–90 percent, so that, taking into account the gain in weight due to the oxygen, 800–900 kg of the desired acid can be produced per ton of the initial aldehyde.

The chemical mechanism of oxidation of higher α, β-unsaturated aldehydes to the respective acids can be represented by the following scheme, α-isopropyl-β-isobutyl-acrolein serving as an example:

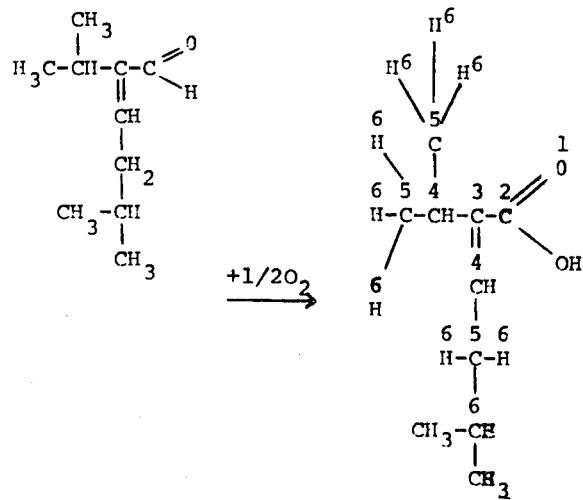

Since α, β-unsaturated carboxylic acids are known to be esterified 30–60 times as slow as their saturated analogues, that is, to give more stable esters, the process of producing branched acids by the present method can be terminated at the oxidation stage. If necessary, α, β-unsaturated carboxylic acids can be hydrogenated by known techniques so as to produce saturated branched carboxylic acids which also find wide industrial application for preparing latex paints known under the brand name of "Veova." The hydrogenation of α, β-unsaturated acids can be carried out according to the following scheme, α-isopropyl- β-isobutyl-acrylic acid serving here as an example:

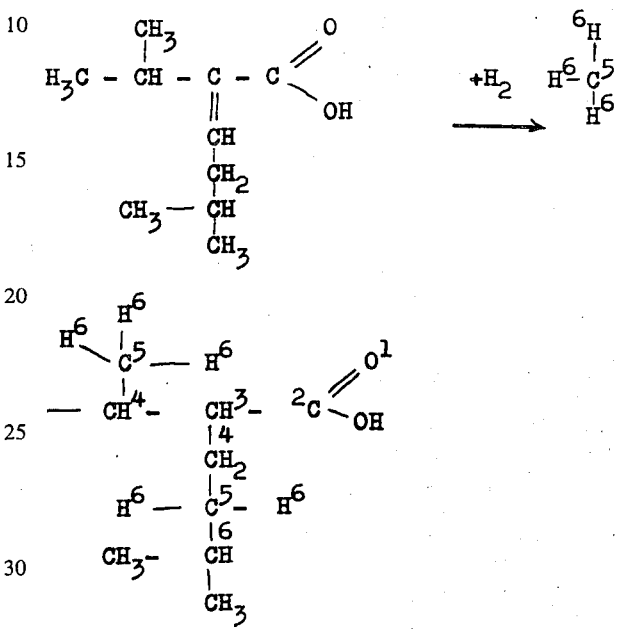

The present method of producing branched higher carboxylic acids can be realized either according to the above-described periodic manner, or as a continuous process.

In case the acids are produced through a continuous process, the starting aldehyde and aqueous alkali solution preheated to a temperature of 40°–50°C are directed to a stage of series-connected reactors, such a stage consisting of 2 or 3 apparatus, the mixture being subjected to vigorous stirring (Re = 20,000–80,000). The temperature in the reactors is maintained within 60°–80°C.

As a result of aldol condensation of the starting aldehyde a higher α, β-unsaturated aldehyde is obtained.

For diminishing the number of side products, the aldol condensation reaction should preferably be continued till the degree of conversion reaches 70–80 percent.

In this case it is necessary to envisage distilling off and recycling of the unreacted initial aldehyde, for which purpose the mixture should be taken over to a settling apparatus. In this apparatus the reaction mixture is separated into an organic and an aqueous phases. The organic phase contains the unreacted initial aldehyde and higher α, β-unsaturated aldehydes. The unreacted aldehyde is recycled to the process and α, β-unsaturated aldehyde is taken to the oxidation stage.

When the aldol condensation reaction is carried out to the degree of conversion of the initial aldehyde of 95–98 percent, a certain increase in the yield of side products is observed (by 2–4 percent). But in this case the products of aldol condensation are taken directly to the oxidation stage, the rectification stage being obviated.

The oxidation of higher $\alpha,\beta$-unsaturated aldehydes is carried out in a reaction apparatus which comprises a reactor where vigorous stirring is performed (Re $\geq$ 50,000) and a packed column with Raschig rings. Aqueous solutions of alkalies serve as a catalyst for the process and air is used as the oxidant.

In the reactor at a temperature of 35°–50°C the higher $\alpha,\beta$-unsaturated aldehyde is oxidized to the degree of conversion of 50–60 percent, still further oxidation of the higher aldehyde to the degree of conversion of 90–95 percent being effected in the packed column. The oxidation products and air are fed to the column in a counter-flow. From the column the oxidation products are fed to a settling apparatus, whereto 15–25 percent sulphuric acid is supplied to decompose organic acid salts and neutralize excess alkali solution to pH=4–7.

In the settling apparatus the reaction mixture becomes separated into an organic and an aqueous phases. The organic layer which contains 80–90 percent of the desired acid is taken to the rectification stage to isolate the commercial product. The aqueous phase which is a weak solution of sodium sulphate is either reused for preparing the alkali solution, or is subjected to evaporation so as to give $Na_2SO_4$.

For a better understanding of the present invention given hereinbelow are examples by way of illustration only, since the invention can be realized under conditions other than particularly specified in the examples which follow.

EXAMPLE 1

A 250 cm³ three-necked flask equipped with a stirrer and a reflux condenser is charged with 50 mg of isovaleraldehyde ($C_5$) and 50 ml of a 7 percent aqueous solution of NaOH. The mixture is heated under stirring to 65°C and kept for 50 min. From the reaction mass 41.6 g of a 76–78°C/10 mm Hg fraction are extracted, this fraction being 2,6-dimethyl, 3-formyl-heptene-3 ($C_{10}$) and containing 98–99 percent of said aldehyde. The yield of the ($C_{10}$) aldehyde for the starting ($C_5$) aldehyde is 93.0 weight percent.

A 1 l reactor made of stainless steel and equipped with a stirrer provided with a diffusor and a water jacket is charged with 41.6 g of the resulting aldehyde $C_{10}$ and 200 ml of a 6 percent aqueous solution of NaOH. The reaction mixture is heated, with the stirrer operating, to 35°C, after which oxygen is continuously supplied thereto from a gasometer and the contents are kept under vigorous stirring till the oxygen absorption completely ceases during 30 min.

After neutralizing the reaction mixture with 15–25 percent sulphuric acid to pH = 4–7, it was allowed to separate into an organic and an aqueous phases by settling.

The organic layer is essentially the desired acid. As a result of said treatment 42.5 g of $\alpha$-isopropyl-$\beta$-isobutyl-acrylic acid ($C_{10}$) were obtained that featured 98.5 percent purity as determined chromatographically. The yield of the acid $C_{10}$ for the corresponding aldehyde is 92.5 percent weight percent and for the initial aldehyde, 86 weight percent.

EXAMPLE 2

Under the conditions specified in Example 1 86.0 g of isovaleraldehyde ($C_5$) and 100 ml of a 1 percent aqueous solution of NaOH are heated to 50°C and kept under stirring for 100 min. From the reaction mass 65.5 g of aldehyde $C_{10}$ are isolated, which makes 85 weight percent for the initial aldehyde $C_5$. 65.5 g of the resulting aldehyde $C_{10}$ are mixed with 200 ml of a 10 percent aqueous solution of NaOH, the mixture is heated to 10°C, then oxygen is supplied thereto and the mixture is kept under stirring for 80 min. After neutralization of the reaction mass, 65.2 g of 98 percent-purity $\alpha$-isopropyl-$\beta$isobutyl-acrylic acid ($C_{10}$) are isolated, the yield thus being 90 weight percent for the aldehyde $C_{10}$ and 76.6 weight percent for the initial aldehyde $C_5$.

EXAMPLE 3

Under the conditions specified in Example 1 32.5 g of isovaleraldehyde ($C_5$) and 50 ml of a 5 percent aqueous solution of KOH are heated to 75°C and kept under stirring for 45 min.

27.6 g of aldehyde $C_{10}$ are obtained, which makes 95 weight percent for the initial aldehyde $C_5$.

27.6 g of the resulting aldehyde $C_{10}$ are mixed with 500 ml of a 3.5 percent aqueous solution of KOH, the mixture is heated to 40°C, then oxygen is supplied thereto and the mixture is kept under stirring for 20 min. After the neutralization of the reaction mass, 28.9 g of 96 percent-purity $\alpha$-isopropyl-$\beta$-isobutyl-acrylic acid ($C_{10}$) are isolated, this being 95 weight percent for the aldehyde $C_{10}$ and 90 weight percent for the initial aldehyde $C_5$.

EXAMPLE 4

Under the same conditions as set forth in Example 1 16.5 g of 3-methyl-hexyl-aldehyde ($C_7$) are mixed with 20 ml of a 10 percent aqueous solution of NaOH. The mixture is heated to 80°C and kept under stirring for 95 min. 13.7 g of aldehyde $C_{14}$ are obtained, which amounts to 90 weight percent for the initial aldehyde $C_7$. These 13.7 g of the resulting aldehyde $C_{14}$ are mixed with 300 ml of a 1 percent aqueous solution of KOH, the mixture is heated to 50°C, oxygen is supplied thereto and the mixture is kept under stirring for 40 min. After the reaction mass has been neutralized with diluted sulphuric acid, 13.4 g of 98.5 percent-purity $\alpha$-isoamyl-$\beta$-isohexyl-acrylic acid ($C_{14}$) are isolated, the yield thus being 91 weight percent for the aldehyde $C_{14}$ and 82 weight percent for the initial aldehyde $C_7$.

EXAMPLE 5

Under the same conditions as described in Example 1 100 g of 3-methyl-octyl aldehyde ($C_9$) are mixed with 100 ml of a 10 percent aqueous solution of NaOH. The mixture is heated to 100°C and kept under stirring for 120 min. 83.2 g of aldehyde $C_{18}$ are thus obtained, which amounts to 89 weight percent for the starting aldehyde $C_9$. These 83.2 g of the aldehyde $C_{18}$ are mixed with 250 g of a 5 percent solution of NaOH, the mixture is heated to 70°C, then oxygen is supplied thereto and the mixture is kept under stirring for 50 min. After that the reaction mass is neutralized with diluted sulphuric acid and 77.5 g of 97 percent-purity $\alpha$-isoheptyl-$\beta$-isooctyl-acrylic acid ($C_{18}$) are isolated, the yield thus being 87.8 weight percent of the acid $C_{18}$ for the aldehyde $C_{18}$ and 78.3 weight percent for the initial aldehyde $C_9$.

What we claim is:

1. A method of producing individual higher branched unsaturated carboxylic acids having at least nine atoms in the "six" position with respect to the carbonyl oxygen, comprising the steps of aldol condensation of β-methyl-branched aldehydes having at least five carbon atoms at a temperature selected from the range of from 50° to 100° C., in the presence of an aqueous alkali solution as a catalyst with a concentration of 1 to 10 weight percent, followed by oxidation of the higher α, β-unsaturated aldehydes formed during the condensation with an oxygen-containing gas in the presence of an aqueous solution of an alkali having a concentration from 1 to 10 weight percent at a temperature selected from the range of from 10° to 70° C and subsequent neutralization of the reaction mass with 15–25 percent sulphuric acid to a ph of 4–7.

2. A method as claimed in claim 1, wherein β-methyl-branched aldehyde $C_5$ is used in the aldol condensation.

3. A method as claimed in claim 1, wherein β-methyl-branched aldehyde $C_7$ is used in the aldol condensation.

4. A method as claimed in claim 1, wherein β-methyl-branched aldehyde $C_9$ is used in the aldol condensation.

5. A method as claimed in claim 1, wherein the aldol condensation is carried out at a temperature selected from the range of from 60° to 80°C.

6. A method as claimed in claim 1, wherein the aldol condensation use is preferably made of an aqueous solution of NaOH having a concentration ranging from 4 to 7 weight percent.

7. A method as claimed in claim 1, wherein oxidation of the higher α, β-unsaturated aldehydes is effected with air.

8. A method as claimed in claim 1, wherein oxidation of the higher α, β-unsaturated aldehydes is carried out at a temperature selected from the range of from 35° to 50°C.

9. A method as claimed in claim 1, wherein for oxidizing the higher α, β-unsaturated aldehydes use is made of an aqueous solution of NaOH with a concentration ranging from 3 to 5 weight percent.

* * * * *